Nov. 24, 1959   J. J. BROPHY ET AL   2,914,728
HALL EFFECT PROBE
Filed Oct. 2, 1956   2 Sheets-Sheet 1

INVENTORS
JAMES J. BROPHY
JOHN W. BUTTREY
BY
Andrew Taras
AGENT

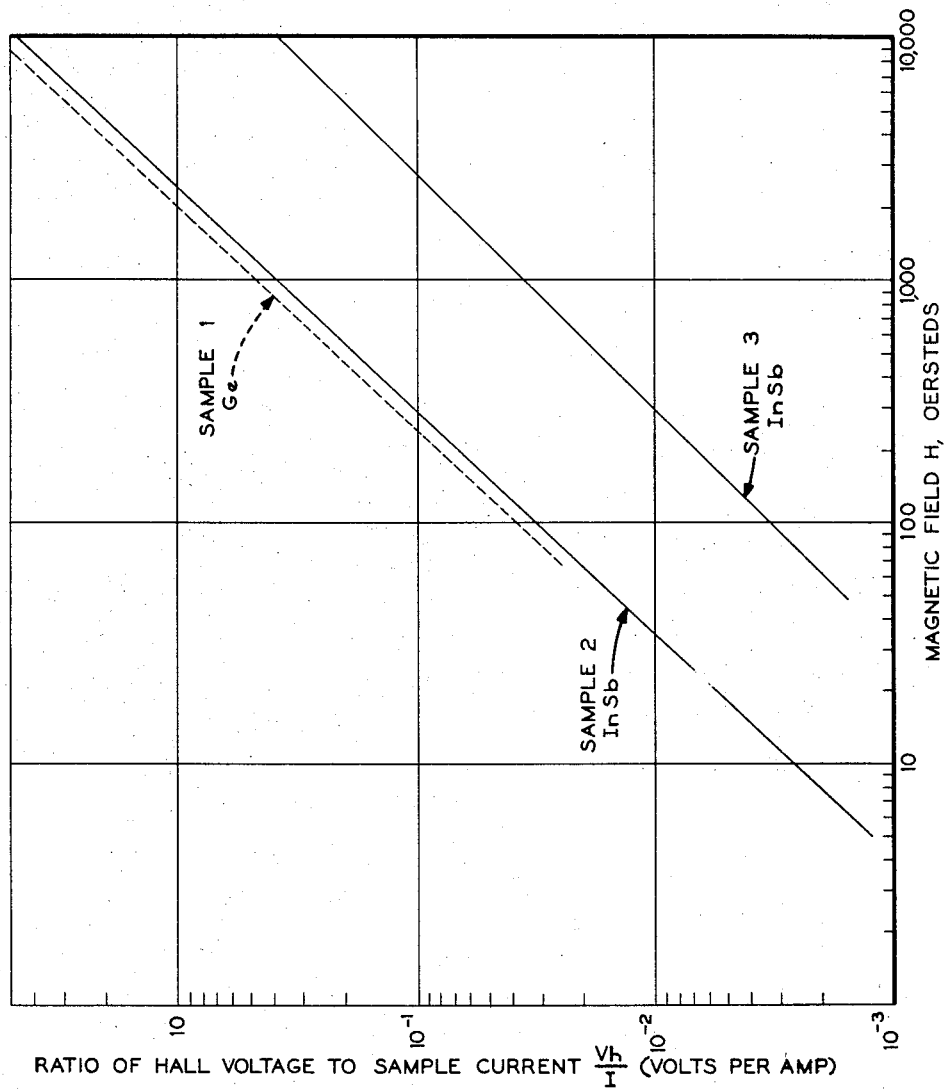
FIG_3

United States Patent Office 2,914,728
Patented Nov. 24, 1959

2,914,728

HALL EFFECT PROBE

James J. Brophy, Western Springs, and John W. Buttrey, Oak Park, Ill., assignors, by mesne assignments, to International Business Machines Corporation, New York, N.Y., a corporation of New York Application October 2, 1956, Serial No. 613,464

11 Claims. (Cl. 324—45)

This invention relates to apparatus for measuring or detecting magnetic fields of extremely high resolution and more particularly to probes which utilize the "Hall effect" for measuring or detecting magnetic fields. Certain Hall effect devices of the prior art are capable of measuring magnetic fields as low as ten oersteds, however, because of their unwieldy construction and large size, they are not capable of measuring or detecting fields of high resolution. A disadvantage inherent in other prior art probes is the relatively low signal to noise ratio which renders these probes unsuitable for the detection of weak magnetic fields and totally useless for measuring fields of relatively high resolution.

The principal object of the invention resides in novel probe structure capable of detecting or measuring magnetic fields with extremely high resolution.

Another object resides in the provision of a novel Hall effect probe structure having a unique configuration whereby signal to noise ratio is greatly increased.

Still another object resides in the provision of a Hall effect probe having a novel configured structure whereby deleterious galvanic and thermal effects inherent in the prior art devices are reduced to such a degree as to provide a Hall voltage which is practically noise-free.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 3 shows Hall voltage curves for three sample Hall type probes.

Figure 1:
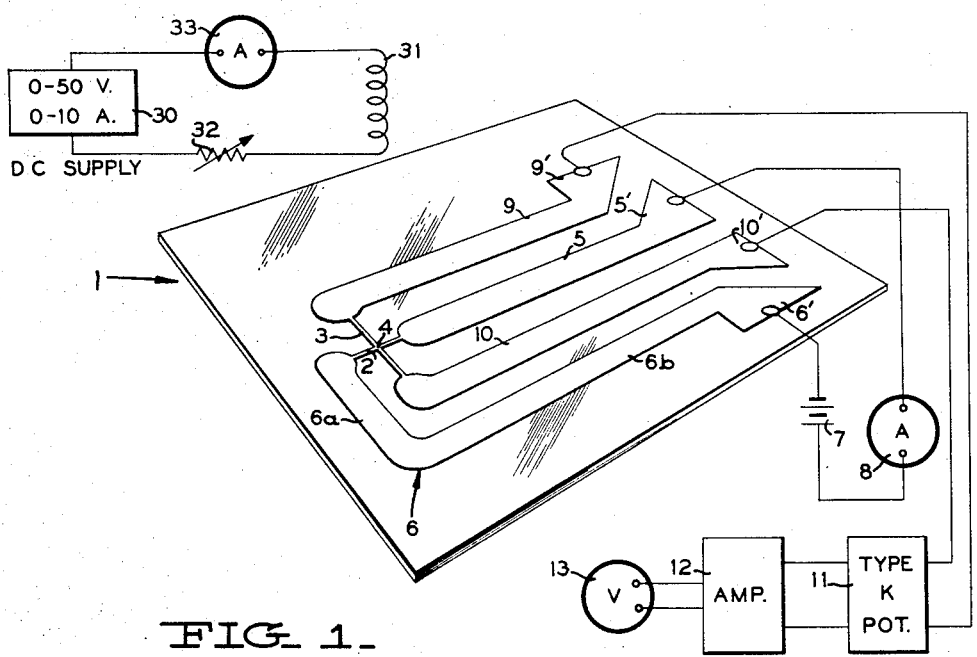
Fig. 1 shows a Hall type probe and test apparatus including means for providing current and a magnetic field.

The Hall effect may be described briefly as the phenomenon which induces, along one of two axes lying in the plane of the conductive material constituting the vital Hall region or area of the probe, a voltage which is proportional to a current flowing through the other of the two axes and a magnetic field directed along a third axis perpendicular to the two axes lying in the plane of the Hall region or area.

The magnitude of the Hall potential is given by the equation $$V_H = \frac{IH}{t} R_H$$

wherein $V_H$ is the induced Hall voltage along one of the two axes, I is the current flowing through the other of the two axes, H is the magnetic field strength along the third axis, $t$ is the thickness of the Hall effect region or area and $R_H$ is the Hall coefficient.

The Hall coefficient is a constant which depends on the character of the material forming the conductive region or area of the probe. The magnitude of the Hall coefficient is given by the equation $$R_H = \frac{1}{ne}$$

wherein $n$ is the charge carrier density and $e$ is the electronic charge. The table below gives the Hall coefficient and the resistivity of ohm-centimeters for various materials such as germanium, bismuth, tellurium, copper and indium antimonide.

| Material | Hall Coefficient | Resistivity |
|---|---|---|
| Germanium (crystalline) | $8(10)^{-5}$ | 5.7 |
| Bismuth | $1(10)^{-8}$ | $1.1(10)^{-4}$ |
| Tellurium | $5.3(10)^{-7}$ | 0.2 |
| Copper | $5.2(10)^{-13}$ | $1.7(10)^{-6}$ |
| Indium Antimonide (heat treated film 1.07 microns thick) | $3.58(10)^{-9}$ | .094 |

Devices employing the principle of the Hall effect for measuring or detecting magnetic field strength and generally referred to as Hall probes, are shown and described in Pearson Patent No. 2,562,120 assigned to Bell Telephone Laboratories and Shaper Patent No. 2,707,769 assigned to Dyna-Labs, Inc.

The structure of the Hall probe forming the subject matter of the present invention may be explained with reference to the drawings particularly Fig. 1 where there is shown a Hall probe generally designated 1 comprised of a thin substrate of a suitable electrical insulating material, for example, glass, quartz, or the like, having a flat surface upon a portion of which there is an adhering thin layer or film of semiconductor material deposited in a manner to be explained. This thin layer includes a cross-shaped configuration formed of intersecting arms 2 and 3, substantially at right angles to each other, with the region or area of intersection 4 constituting the Hall effect area, or region, of the probe. To each of the opposite end regions of the arm 2 there are integral extended arm portions respectively 5 and 6 terminating at end portions 5' and 6' to which are secured connections extending to a source of electrical energy 7 for supplying a current through the vertical arm portion 2. Included in the connections to the source 7 is a meter 8 for indicating the magnitude of current flow. The extended arm portion 6 has a portion 6a in proximity to the arm 2 and a remote portion 6b substantially at right angles to the portion 6a. To each opposite end region of the arm 3 there are integral extended arm portions respectively 9 and 10 terminating at end portions 9' and 10' to which are secured connections extending to a type K potentiometer 11. From the latter, connections extend to a Liston Becker Model 14 breaker amplifier 12 having a connection to a Simpson Model 260 D.C. voltmeter 13. The extended arm portions 10, 9, 6a and 5 have axes generally parallel to each other.

By virtue of this configuration, the Hall region, or area, 4 is virtually isolated from the terminal regions 5', 6', 9' and 10' to which connections are made to the various external devices mentioned. In the prior art device, connections to the Hall element are made in the immediate vicinity of the vital area. As such these regions, whereat the connections are made, are the source of certain deleterious galvanic and thermal effects which result in the introduction into the Hall voltage of undesirable voltage noise components. By isolating the vital regions from the regions whereat the connections are made is the noise component minimized to an extent which enables a Hall voltage to be generated with practically no noise component.

The upper left side of Fig. 1 represents apparatus for generating a magnetic field. This apparatus comprises a D.C. supply 30, a coil 31 which supplies a magnetic field, a potentiometer 32, a current meter 33 and appropriate connections.

The process whereby the semiconductor material is deposited on the flat surface of the insulating material, the substrate, is effected under rather rigid conditions. The substrate is cleaned thoroughly by successively washing in potassium dichromate cleaning solution, water, carbon tetrachloride, water, dilute hydrochloric acid and finally distilled water. In addition, provision is made for ion bombardment of the substrate in a vacuum chamber. After the cleaning operation, the flat surface of the substrate is coated with a gelatin-like substance capable of being polymerized when subjected to the influence of intense visible radiation. An exacting macroscopic copy of the desired design, for example the configuration of Fig. 1, is placed a few centimeters from the gelatinized surface. The design is then irradiated with intense visible light to thereby impinge upon the gelatinized surface an image of the design, the imaged area being unpolymerized by the absence of the light radiation while the irradiated area becomes polymerized. Next, the substrate is immersed in alcohol which dissolves the unpolymerized design area thereby exposing the glass surface portion of that design area of the substrate. Then the substrate, which is at room temperature, is placed in a standard vacuum coating apparatus in which is contained a tungsten basket having a quantity of the semiconductor, for example germanium or indium antimonide. The tungsten basket is heated for a period to cause evaporation of the semiconductor which deposits itself as a thin layer, or film, upon the entire gelatinized surface. The evaporation process continues until the desired thickness is obtained which may be anywhere from 0.1 micron to several microns. After the evaporation process is completed, the substrate is removed from the evaporation apparatus and then subjected to a warm bath, containing a weak solution of sulfuric acid which removes only that portion of the semiconductor film which is in contact with the polymerized gelatin thus leaving a thin film of the design or configuration on the surface of the substrate.

Germanium film so produced on substrates at room temperature are amorphous and have very high resistance. By heat treatment of these films in an inert atmosphere, for example helium or hydrogen, to a temperature above 500° centigrade, the amorphous structure of the film is changed to a crystalline structure. The amorphous films are of n-type conductivity which converts to a p-type conductivity during the heat treatment.

Dimensionally speaking, the widths of the current arm 2 and the voltage arm 3, in one type of Hall probe, are approximately .0015″ and .0008″, respectively. In a similar but small type of Hall probe these dimensions are respectively .0008″ and .0004″, the smaller probe being suitable for detecting magnetic fields having a spatial resolution of about 10 microns. With this degree of resolution this probe is capable of reading magnetic spots on media, such as magnetic tape or the like, on which spot density may be of the order of 10,000,000 bits per square inch.

Figure 2:
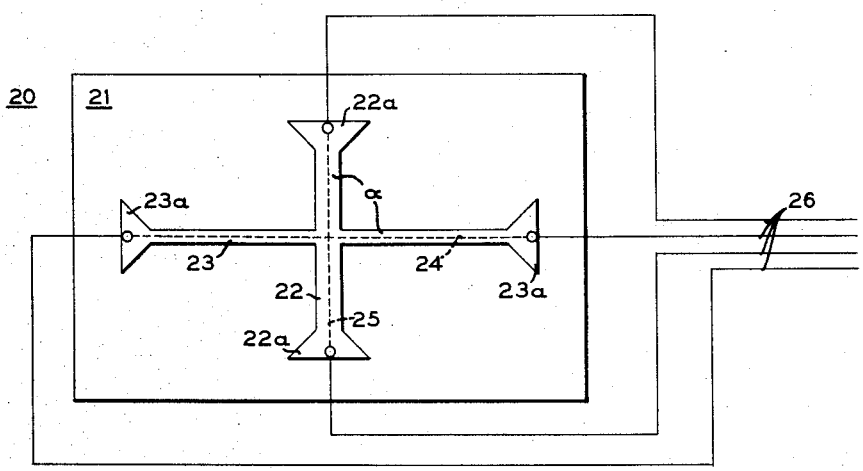
Fig. 2 shows another embodiment of the Hall type probe.

Figure 2 shows another Hall probe having a cross-shaped configuration. The probe is generally referenced as 20 and comprises a substrate 21 having a flat surface upon a portion of which is the cross-shaped film of semiconductor material. The configuration is formed of arms 22 and 23 having end regions 22a and 23a. Axes of intersection are identified as 24 and 25. The arms may be oriented so as to provide a first angle of intersection ($\alpha$) which may be substantially 90°, or slightly more than, or slightly less than 90°. Wires 26 may be of any noble metal, or copper, soldered to the end regions of the probe.

Figure 3 shows the ratio of Hall voltage to sample current in a magnetic field ranging from one to 10,000 oersteds for three sample probes, sample one having a film of germanium, and samples two and three each having a film of indium antimonide (In Sb). Below are shown various characteristics such as film thickness, resistivity, Hall coefficient ($R_H$), mobility and carrier density for these three sample probes.

| | Film Thickness, Microns | Resistivity, Ohm/cm. | $R_H$ | Mobility, cm.$^2$/Volt Sec. | Carrier Density Per cc. |
|---|---|---|---|---|---|
| 1. Ge | 1.6 | 0.42 | $8.96 \times 10^{-3}$ | 2.15 | $6.98 \times 10^{17}$ |
| 2. In Sb | 1.07 | 0.94 | $3.58 \times 10^{-9}$ | 3.85 | $1.74 \times 10^{19}$ |
| 3. In Sb | 0.567 | 0.018 | $2.57 \times 10^{-5}$ | 143 | $2.4 \times 10^{-18}$ |

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A probe structure embodying the Hall effect for use in measuring magnetic field strength comprising a thin electrical insulating support such as glass or the like, having a flat surface area; a thin layer, in the order of several microns, of evaporated semiconductor material deposited on and adhering to a portion of said flat surface, said thin layer comprising a cross-shaped configuration having vertical and horizontal arm portions lying in the plane of said thin layer, and whose axes intersect each other at substantially right angles, said cross-shaped configuration having an area of intersection which provides a Hall voltage when subjected to the influence of electrical and magnetic forces; and said layer further constituting a plurality of extended arm portions having integral connections to the cross-shaped configuration, one such extended arm portion for each of the arms of the cross-shaped configuration.

2. A probe structure as defined in claim 1 further characterized in that said thin layer is constituted of germanium.

3. A probe structure as defined in claim 1 further characterized in that said thin layer is constituted of indium antimonide.

4. A probe structure embodying the Hall effect for use in measuring magnetic field strength comprising a thin electrical insulating support such as glass, or the like, having a flat surface area; a thin layer, in the order of several microns, of evaporated semiconductor material deposited on and adhering to a portion of said flat surface, said thin layer comprising a cross-shaped configuration formed of intersecting arm portions whose axes of intersection are substantially at right angles to each other and having an area of intersection constituting the Hall effect area, a pair of parallel spaced apart extended arm portions integrally connected to opposite end regions of the horizontal arm portions, a third extended arm portion integrally connected to one end region of said vertical arm portion and extending parallel to and spaced from said pair of parallel extended arm portions and a fourth extended arm portion integrally connected to the opposite end region of said vertical arm portion and having a proximate portion extending generally parallel to said horizontal arm portion and a remote portion extending parallel to said pair of parallel extended arm portions.

5. A probe structure as in claim 4 further characterized in that one of the arm portions of the cross-shaped configuration is approximately twice as wide as the other arm portion.

6. A probe structure as in claim 5 further characterized in that the extended arm portions integrally connected with the cross-shaped configuration are all substantially of the same width and such width being substantially greater than the width of said one of the arm portions.

7. A probe structure as in claim 6 further characterized in that the lentgh of said one of the arm portions is less than the length of said other arm portion.

8. A probe structure as in claim 7 further characterized in that the length of said one of the arms is approximately half the length of said other arm portion.

9. Apparatus including a probe structure embodying the Hall effect for sensing magnetic fields of high resolution comprising a thin electrical insulating support having a flat surface area; a thin layer, in the order of several microns, of evaporated semiconductor material deposited on and adhering to a portion of said flat surface, said thin layer comprising a cross-shaped configuration formed of intersecting vertical and horizontal arm portions whose axes of intersection are substantially at right angles to each other and having an area of intersection constituting the Hall effect area, the horizontal arm portion having a width in the range of from .002 to .0008, the vertical arm portion having a width in the range of from .0008 to .0004, a plurality of spaced apart extended arm portions integrally connected to opposite end regions of the cross-shaped configuration one such extended arm portion for each arm of the cross-shaped configuration; a D.C. source, a pair of connections from the latter to the extended arm portions associated with the horizontal arm for supplying a steady flow of direct current through the latter arm; voltage responsive means including connections to the extended arm portions associated with the vertical arm through which a Hall voltage is generated when the Hall area is subjected to the influence of a magnetic field.

10. Apparatus as defined in claim 9 further characterized in that said semiconductor is germanium.

11. Apparatus as defined in claim 10 further characterized in that said semiconductor is indium antimonide.

References Cited in the file of this patent

UNITED STATES PATENTS

| | | |
|---|---|---|
| 2,508,030 | Karns | May 16, 1950 |
| 2,562,120 | Pearson | July 24, 1951 |
| 2,607,821 | Van Arsdell | Aug. 19, 1952 |
| 2,707,769 | Shaper | May 3, 1955 |
| 2,760,127 | Duncan et al. | Aug. 21, 1956 |
| 2,814,015 | Kuhrt | Nov. 19, 1957 |
| 2,825,858 | Kuhrt | Mar. 4, 1958 |